(12) United States Patent
Cook et al.

(10) Patent No.: US 6,550,623 B2
(45) Date of Patent: Apr. 22, 2003

(54) TRANSPORTABLE PART RACK

(75) Inventors: Joseph L. Cook, Utica, MI (US); Jamie E. Noble, Windsor, WI (US); Randall B. Vest, Portage, WI (US)

(73) Assignee: Wilbert, Inc., Broadview, IL (US)

( * ) Notice: Subject to any disclaimer, the term of this patent is extended or adjusted under 35 U.S.C. 154(b) by 0 days.

(21) Appl. No.: 09/800,432

(22) Filed: Mar. 5, 2001

(65) Prior Publication Data

US 2002/0121489 A1 Sep. 5, 2002

(51) Int. Cl.[7] .................................................. A47F 7/00
(52) U.S. Cl. ........................ 211/13.1; 211/41.1; 206/448
(58) Field of Search ............................... 211/41.1, 13.1, 211/10, 11, 50, 41.14; 206/448, 449

(56) References Cited

U.S. PATENT DOCUMENTS

| | | | |
|---|---|---|---|
| 1,285,793 A | | 11/1918 | Reeves |
| 1,692,231 A | * | 11/1928 | Thompson |
| 2,156,955 A | * | 5/1939 | Page |
| 3,269,547 A | * | 8/1966 | Chamberlin ................ 211/11 |
| 3,282,438 A | | 11/1966 | Frechette |
| 3,675,781 A | * | 7/1972 | Chamberlin ................ 211/11 |
| RE27,462 E | | 8/1972 | Gutierrez |
| 4,231,175 A | | 11/1980 | Baxter |
| 4,504,235 A | * | 3/1985 | Jones et al. ............... 211/50 X |
| 4,921,100 A | * | 5/1990 | Krause ....................... 206/448 |
| 4,976,092 A | | 12/1990 | Shuert |
| 5,217,121 A | * | 6/1993 | Walker ...................... 211/41.1 |
| 6,089,382 A | * | 7/2000 | Eros et al. ................. 211/13.1 |
| 6,135,294 A | * | 10/2000 | Shuert ....................... 211/13.1 |

* cited by examiner

Primary Examiner—Robert W. Gibson, Jr.
(74) Attorney, Agent, or Firm—Blackwell Sanders Peper Martin, LLP

(57) ABSTRACT

A rack for the transport of thin wall parts such as automotive body panels stampings has a steel frame with two parallel channels positioned on either side of a planar floor member. Each channel has a series of parallel slots which receive tabs extending downwardly from parallel plastic leaves. The leaves are restricted from removal from the rack by rods which extend through the frame beneath the channels and through rod openings in the tabs. The plastic leaves are of two types having side structures which do not nest. Because the leaves are not hinged to the floor member, they will stay in either position due to gravity. The non-nesting leaf side structures permit a plurality of leaves to be flipped from one position to the other simultaneously.

10 Claims, 4 Drawing Sheets

TRANSPORTABLE PART RACK

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to racks for the transport of thin wall parts in general, and more particularly to racks which have the capacity to be loaded and unloaded at the top and sides.

Many sheet metal stampings, plastic panels, and composite carbon fiber panels go into the construction of an automobile. In particular, exterior body panels are often formed of thin wall parts. The parts are fabricated, for example, in stamping mills, and are then transported to assembly lines where the panels are assembled and painted. Because many of these stamped parts are visible to the customer, it is imperative that they be free of scratches, dings, or distortions. At the same time, for efficient transport and assembly it is desirable that these parts be readily and conveniently accessible, while also being protected from contact with exterior objects or with other adjacent parts.

U.S. Pat. No. 4,976,092 discloses a rack having a steel frame open to the top and sides, and having a horizontal plywood board to which a series of parallel plastic leaves are connected by living hinges which are screwed in place. The plastic leaves are formed as single sheet thermoformed thermoplastic parts which have projecting edge portions which allow the edges of adjacent leaves to nest. This rack receives individual metal parts between pairs of plastic leaves. The rack is loaded with parts at the place of manufacture, then transported on a forklift vehicle, for loading and transport to eventually reach its final destination where the metal parts are removed. Although such a rack provides advantageous clearance for side loading, it provides certain deficiencies. Because the leaves are hinged directly to the plywood board, they have a tendency to return to an initial orientation, rather than remaining where positioned. In addition, the nesting edge portions can cause the adjacent leaves to lock together to prevent multiple leaves from being flipped at once between loading and transport positions. Moreover, as the plastic leaves must be replaced from time to time to reconfigure the rack for new parts, the removal and reattachment of the leaves to the plywood board is laborious and time-consuming, and costly in terms of additional fasteners required.

What is needed is a side or top loading part rack which is rapidly assembled, easily operated, easily maintained and which avoids locking or interference of adjacent leaves when being turned in groups.

SUMMARY OF THE INVENTION

A rack for the transport of thin wall parts such as automotive body panel stampings has a steel frame with two parallel channels positioned on either side of a planar floor member. Each channel has a series of parallel slots which receive tabs extending downwardly from parallel plastic leaves. The leaves are restricted from removal from the rack by rods which extend through the frame beneath the channels and through rod openings in the tabs. The plastic leaves are of two types having side structures which do not nest. Because the leaves are not hinged to the floor member, they will stay in either position due to gravity. The non-nesting leaf side structures permit a plurality of leaves to be flipped from one position to the other simultaneously.

It is an object of the present invention to provide a rack for metal stampings having a plurality of plastic leaves which are readily removed and replaced.

It is another object of the present invention to provide a rack for metal stampings in which multiple plastic leaves may be pivoted simultaneously without interference between each other.

It is also an object of the present invention to provide a rack for metal stampings in which individual plastic leaves remain where positioned and do not have a tendency to return to an initial position.

It is a further object of the present invention to provide a rack which eliminates any hinged connection between the plastic leaves and the rack.

Further objects, features and advantages of the invention will be apparent from the following detailed description when taken in conjunction with the accompanying drawings.

DESCRIPTION OF THE PREFERRED EMBODIMENTS

Figure 1:
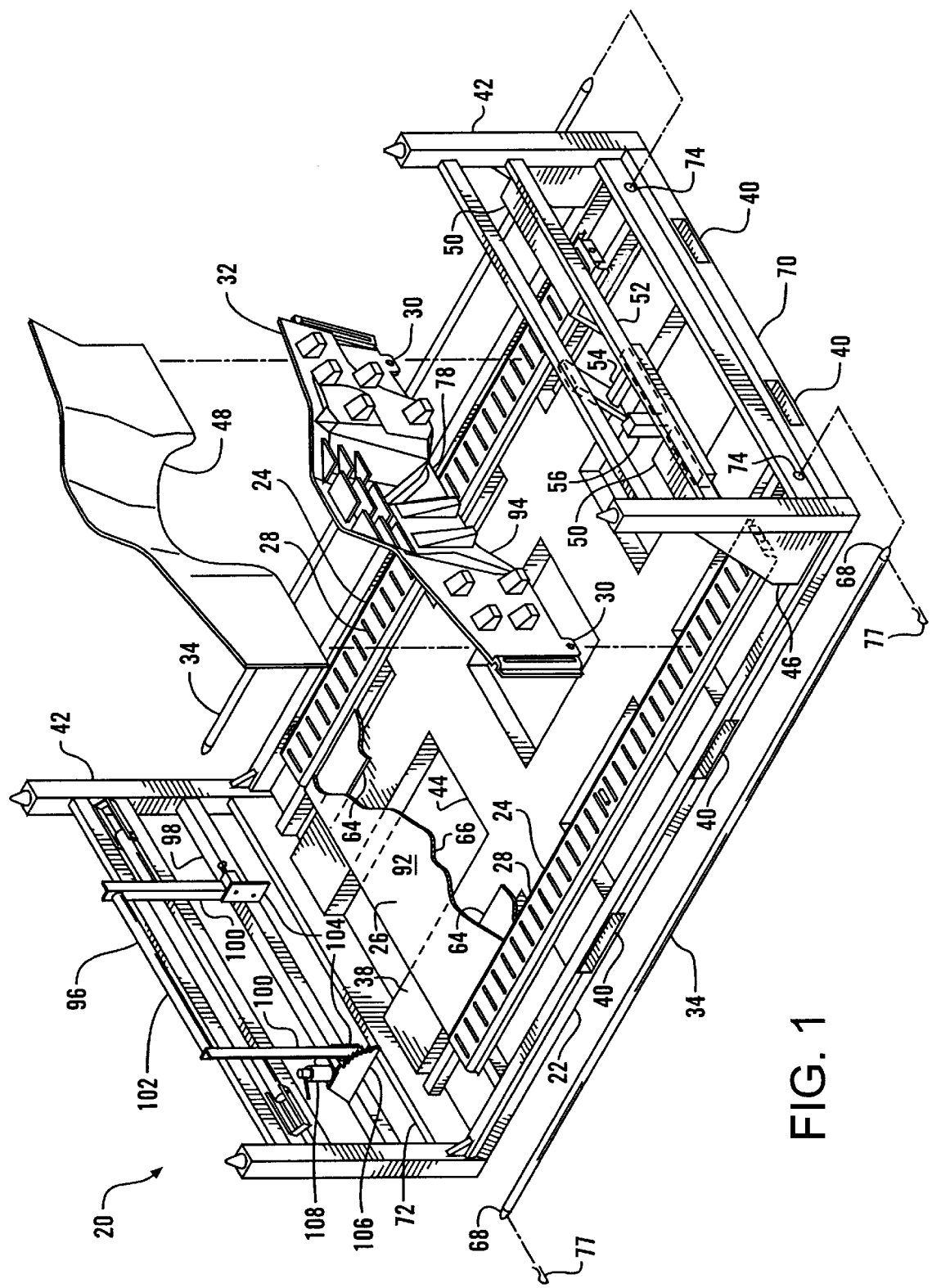
FIG. 1 is an exploded isometric view of the rack of this invention.

Referring more particularly to FIGS. 1–4, wherein like numbers refer to similar parts, a rack 20 is shown in FIG. 1. The rack 20 has a steel frame 22 which has two parallel channels 24 positioned on either side of a planar floor member 26. Each channel has a series of parallel slots 28 which receive tabs 30 which extend downwardly from plastic leaves 32. The leaves 32 are restricted from removal from the frame 22 by rods 34 which extend through rod openings 36 in the tabs 30.

The frame 22 has a base structure 38 comprised of square and rectangular metal tubing 44 welded together to provide four way entry openings 40 adapted to receive the protruding tines of a forklift vehicle. Four corner posts 42 extend upwardly from the frame base structure 38. The height of the corner posts 42 is determined by the size of the parts to be accommodated by the rack 20, but will generally be between 12 and 100 inches tall. Inclined ramps 46 are fixed to the front corner posts. The ramps 46 support the inclined leaves 32 when they are loaded with sheet metal or other thin wall parts 48. The leaves are also supported by two angled front plates 50 which are fixed to a front crossbar 52, a front horizontal member 54 which extends rearwardly from the front crossbar 52, and a front bar 56 which extends upwardly from the base structure 38 rearward of the horizontal member 54. This front structure serves to maintain the parallelism of the panels during shipment, and the particular arrangement of ramps, angled front plates, or bars will vary depending on the geometry of a particular part to be transported.

Figure 4:
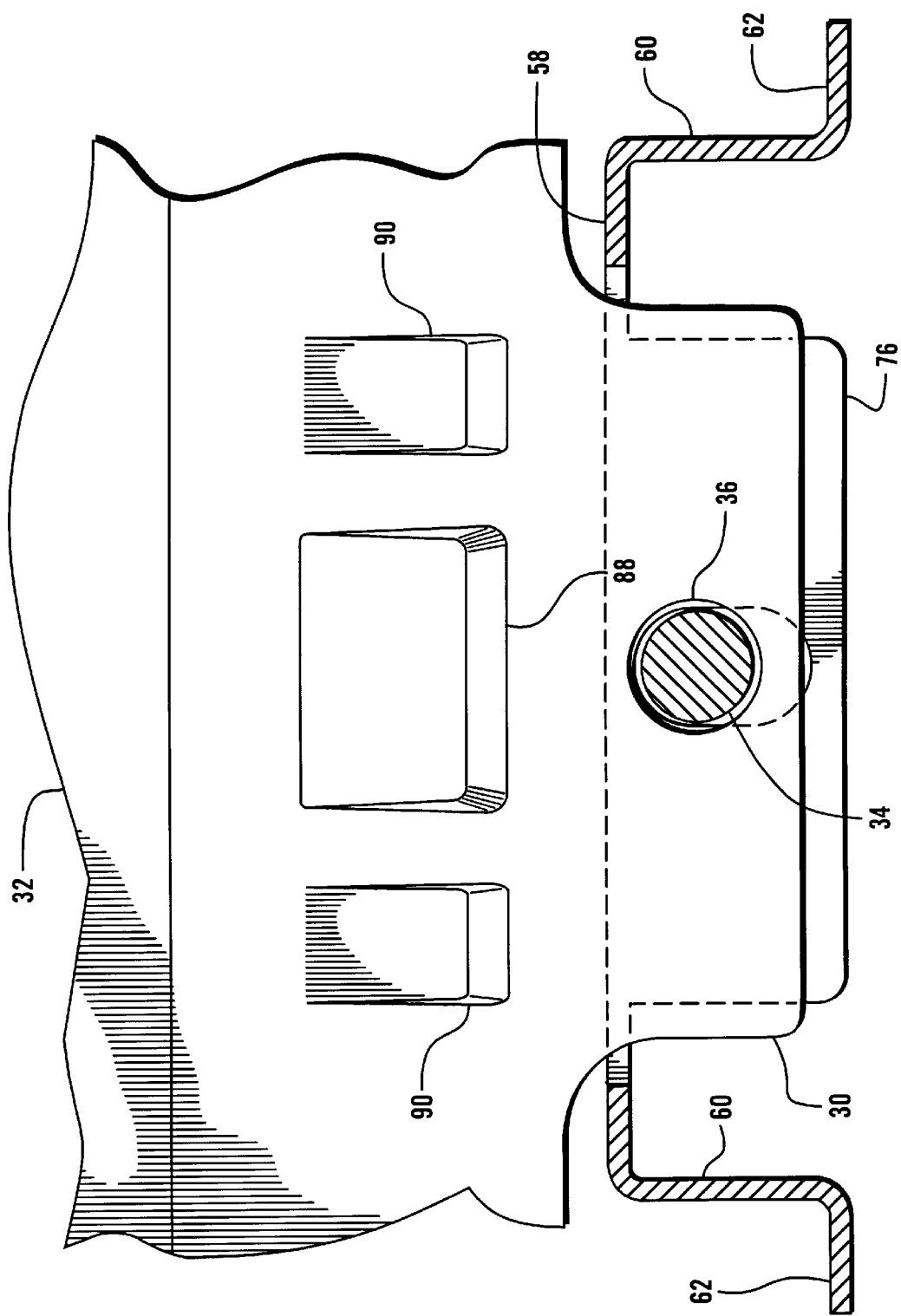
FIG. 4 is a fragmentary cross-sectional view of a leaf of the rack of FIG. 2 shown in relation to a frame channel illustrated in phantom view.

The channels 24 may be formed of ⅛ to ¼ inch thick sheet. As shown in FIG. 1, the channels 24 are fixed to the base structure 38 of the frame 22. As shown in FIG. 4, each channel has a top wall 58 which has portions defining an array of parallel slots 28. The two channels 24 are positioned such that the slots of one channel are aligned with the slots of the other. The channel top wall 58 is spaced above the base structure 38 by two parallel channel side walls 60 which have outwardly extending flanges 62 which are fixed to the base structure 38 such as by welding. Each slot is about five inches wide, and the slots are separated from each other on about 2.5 inch centers. However, the spacing or index of the slots may range from 1 to 5 inches. Each slot is approximately three times the thickness of the plastic at the tab, thus for a ⅛ inch thick tab as illustrated, the slot is about ⅜ inch wide.

The floor member 26 extends between the two channels 24 and has a top surface which is at approximately the same level as the top wall 58 of the channels. The floor member 26 may be composed of two strips 64 of three-quarter inch plywood which extend in the front to back direction and which are fastened to the base structure 38, and a single sheet 66 of one-half inch plywood which is fastened to the strips.

Figure 2:
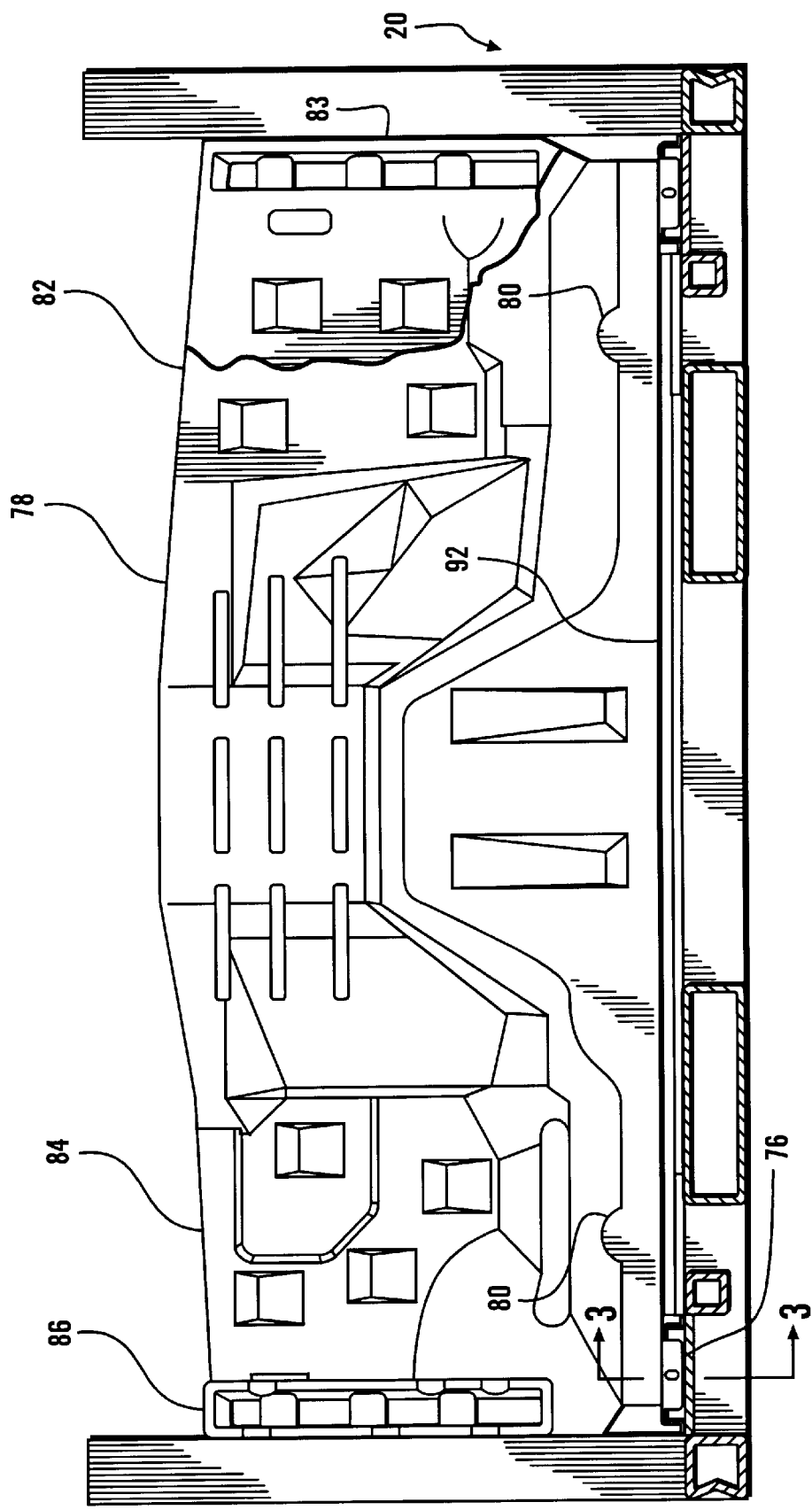
FIG. 2 is a cross-sectional view of the rack of FIG. 1, a first leaf being partially broken away to reveal a second leaf having different side structure.

The two rods 34 may be one-half inch diameter solid steel rods which taper to 3/16 inches in diameter at one-half inch long tapered ends 68. The front beam 70 and the rear beam 72 of the base structure 38 are provided with oblong holes 74 through which the rods 34 are inserted within the channels 24. Flanges 76 extend downwardly at the front and rear of the channels 24, as shown in FIG. 2, and have circular or oblong slots routed or punched therein through which the rods 34 extend. In addition, a downwardly extending plate with a similar sized slot in is welded extending downwardly from the channel top walls 58 at a position approximately centered between the front and the rear of each channel 24. When received within the slots in the flanges 76 and the center plates, the rods 34, which may be about 86 inches long, are restrained from excessive bending. Once the rods are positioned to extend through the openings in the leaf tabs 30, cotter pins 77 are inserted through 3/16 inch diameter holes in the ends of the rods to restrain the escape of the rods from the frame. It should be noted that the rods may also be fabricated from non round parts, and from tubular parts.

Each leaf or panel 32, which may be substantially planar, has two downwardly extending tabs 30, as best shown in FIG. 4, which are received within a pair of slots 28 in the opposed channels. The panels preferably include leaves, sheets, partitions, or other substantially planar structures operable to separate the parts supported by the rack. Each leaf 32 is configured with customized dunnage structure 78. The dunnage structure 78 may be an arrangement of protrusions and recesses configured to engage and retain a particular metal part 48 between the leaves 32. For example, semicircular shells 80 may have slots routed in them to retain the lower edges of the sheet metal parts 48. In any event, the dunnage structure 78 may vary depending upon the type of part which is intended to be conveyed within the rack 20.

Figure 3:
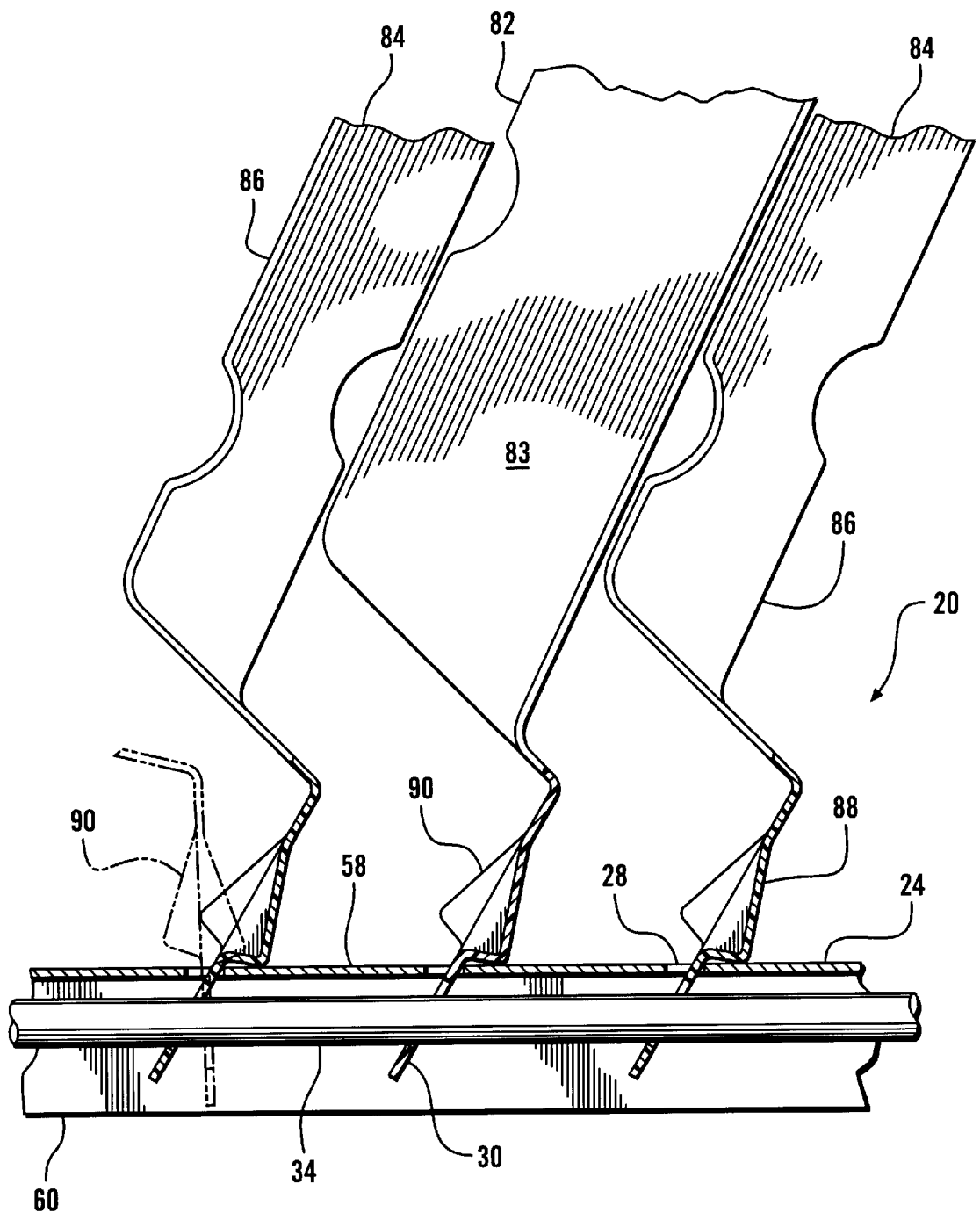
FIG. 3 is a cross-sectional view of the rack of FIG. 2 taken along section line 3—3.

When the leaves 32 are formed as single sheet thermoformed parts, every projection on one surface has a corresponding recess on the opposed surface. In the prior art racks, this relationship between adjacent leaves resulted in nesting engagement between leaves in the course of pivoting a leaf from a loaded to an unloaded position. When the leaves nested—generally at the position perpendicular to the floor—adjacent leaves would become locked together and would pivot no further. Hence, to avoid this nesting, it became necessary to pivot the leaves one by one. The rack 20 of this invention eliminates entirely this tendency to lock and permits simultaneous pivoting of groups of leaves. Nesting is eliminated by providing nonidentical molded leaves 32: a first leaf 82 which has side margins 83 which project frontwardly from a flange around the dunnage structure, and a second leaf 84 which has side margins 86 which project rearwardly from a flange around the dunnage structure. The dunnage structure is substantially the same on both the first leaves 82 and the second leaves 84. The leaves are interspersed on the frame alternating between a first leaf 82 and a second leaf 84. As shown in FIG. 3, the result of this arrangement is that the frontwardly protruding side margins of each first leaf 82 will engage against the rearwardly protruding side margins of a preceding second leaf 84. Moreover, the flanges from which the side margins protrude will engage against each other without nesting, to permit unhindered sliding movement between adjacent side margins as the leaves are pivoted in groups from one working position to the other.

As shown in FIG. 4, each leaf has three ribs above each tab, which help to stiffen the leaf in the vicinity of the tab, to carry loads away from the tab, and to support the leaves at a desired repose angle in both the loaded and unloaded positions. A center rib 88 projects rearwardly, while two side ribs 90 project frontwardly, one on each side of the center rib. The lower edges of the ribs 88, 90 are positioned at approximately the same level as the lower margin 94 of the leaf adjacent to the tabs 30. The lower margin 94 of each leaf is generally supported on the top surface 92 of the floor member 26.

As shown in FIG. 3, the leaves 32 are each movable between two positions of repose. In a first unloaded position, the leaves are inclined toward the rear of the rack 20, and toward a brace assembly 96 mounted to a rear cross bar 98 which extends between the rear corner posts 42. In the unloaded position, each leaf is inclined from the horizontal plane of the top walls 58 of the channels 24. The second, loaded, position is rotated from approximately 10° to 60° from the first position, into a position in which the tabs 30 are inclined slightly toward the front of the rack. The amount of inclination will vary depending on the transported part. In the first unloaded position, the center rib 88 will generally be close to or engaging the top wall 58 of the channels 24, while in the second loaded position, the side ribs 90 will generally be close to or engaging the top wall of the channels.

The rack 20 will typically be used in a manufacturing facility in proximity to a source of formed sheet metal parts 48. In its initial setup, all but the first leaves 32 are pivoted toward the rear of the rack, in the unloaded position. The first leaf 32 is pivoted toward the front of the rack in the loaded position. The first part 48 is positioned inclined against the first leaf 32, with the lower edge of the part 48 being restrained by the semicircular shells 80. The second leaf 32 is then pivoted from the unloaded to the loaded position to overlie the first leaf and to surround the part 48. The edge structure and other protrusions of the dunnage structure 78 protect the part 48 and prevent its contact with other parts. These steps are repeated until each leaf 32 is loaded with a part 48. Then, the brace assembly 96 is pivoted toward the front of the rack to restrain all the leaves in the loaded position.

As shown in FIG. 1, the brace assembly 96 has two upwardly extending members 100 connected by a cross member 102. The lower ends of the members 100 are mounted by pins to brackets 104 which project frontwardly from the rear crossbar 98. One of the upwardly extending members 100 has a spring-loaded pin is extendable into a pin hole in one of the brackets 104 and which retains the brace assembly in a nonengaged position during loading of the parts. A toothed cam 106 extends frontwardly from the rear crossbar 98 alongside one of the upwardly extending members 100. Another spring-loaded pin 108 is fixed to an upwardly extending member 100, and acts as a ratchet against the toothed cam 106 to allow the brace assembly to be pressed down to engage the loaded leaves. During shipment the parts may shift or compress, which could allow a front to back movement of the parts. The weight of the cross member 102 can automatically cause the brace assembly 96 to ratchet into tighter engagement to take up any looseness.

It is understood that the invention is not limited to the particular construction and arrangement of parts herein illustrated and described, but embraces all such modified forms thereof as come within the scope of the following claims.

We claim:

1. A rack assembly for supporting a plurality of workpieces, the rack assembly comprising:
   a rigid frame having a top wall having portions defining a plurality of sidewardly extending slots, the slots being spaced parallel to one another in a front to back direction;
   a plurality of upwardly extending panels, wherein each panel has at least one downwardly extending tab which extends through one of said frame slots;
   portions of each panel tab defining a rod opening; and
   a first rod extending from front to back through a tab of each of the panels, the rod being positioned beneath the frame top wall, wherein the panels are restricted against upward removal from the frame by engagement with the first rod and are free to pivot within the slots between a first position spaced from an adjoining panel to define a loading opening, and a second position in contact with the adjoining panel.

2. The assembly of claim 1, wherein at least one of said panels has above each tab, a center rib which projects rearwardly, and two side ribs which project frontwardly, one on each side of the center rib, the lower edges of the ribs being positioned at approximately the same level as a lower margin of the panel adjacent to the tabs; and wherein each panel is movable between two positions of repose, in a first unloaded position, the panels are inclined toward a rear of the rack, and in a second, loaded, position, each panel is rotated from approximately 10° to 60° from the first position, into a position in which the tabs are inclined toward a front of the rack, and wherein in the first unloaded position, the center rib is close to the top wall of at least one channel, while in the second loaded position, the side ribs are close to the top wall of the channel.

3. The assembly of claim 1, wherein the panels are free to pivot in at least two directions.

4. The assembly of claim 1, wherein the frame comprises square and rectangular metal tubing that is operable to provide forklift entry openings.

5. The assembly of claim 4, wherein the forklift entry openings are four-way forklift entry openings.

6. The assembly of claim 1, herein the frame comprises:
   a plurality of front corner posts affixed to a frame base and extending upwardly from the frame base;
   at least one front crossbar extending laterally between the front corner posts;
   at least one front horizontal member extending rearwardly from the front cross bar; and
   at least one angled front plate affixed to the front crossbar and to the front horizontal member.

7. The assembly of claim 6, further comprising inclined ramps affixed to the front corner posts.

8. The assembly of claim 1, wherein the frame top wall comprises at least one channel having the sidewardly extending slots operable to receive the panel tabs and to restrict upward panel removal when the first rod is inserted into the rod opening of each panel.

9. A rack assembly for supporting at least one thin wall part, the rack assembly comprising:
   a frame having a at least one channel including a plurality of sidewardly extending slots, the slots being spaced substantially parallel to one another in a front to back direction;
   at least one upwardly extending panel, wherein the panel has at least one downwardly extending tab extending through one of the slots, portions of the panel tab defining at least one rod opening; and
   at least one rod extending from front to back through the rod opening, the rod being positioned below an upper surface of the channel, wherein the panels are free to pivot within the slots between a first position spaced from an adjoining panel to define a loading opening, and a second position in contact with the adjoining panel.

10. A rack assembly for supporting parts, the rack assembly comprising:
    a frame having a at least one channel including a plurality of sidewardly extending slots, the slots being spaced substantially parallel to one another in a front to back direction;
    at least one upwardly extending first leaf of a first leaf type, wherein the first leaf has at least one downwardly extending tab extending through one of the slots, portions of the leaf tab defining at least one rod opening, and wherein the first leaf has frontwardly projecting side margins;
    at least one upwardly extending second leaf of a second leaf type, wherein the leaf has at least one downwardly extending tab extending through one of the slots, portions of the leaf tab defining at least one rod opening, and wherein the second leaf has rearwardly projecting side margins that, in connection with the frontwardly projecting side margins of the first leaf, prevent the first and second leaves from interlocking; and
    at least one rod extending from front to back through the rod opening, the rod being positioned below an upper surface of the channel, wherein the first and second leaves are free to pivot within the slots between a first position spaced from an adjoining panel to define a loading opening, and a second position in contact with the adjoining panel without interlocking.

* * * * *

UNITED STATES PATENT AND TRADEMARK OFFICE
CERTIFICATE OF CORRECTION

PATENT NO.    : 6,550,623 B2
DATED         : April 22, 2003
INVENTOR(S)   : Joseph L. Cook, Jamie E. Noble and Randall B. Vest It is certified that error appears in the above-identified patent and that said Letters Patent is hereby corrected as shown below:

Column 6,
Line 1, delete "herein" and insert -- wherein --.
Line 38, delete "having a at least" and insert -- having at least --.

Signed and Sealed this

Twenty-fifth Day of November, 2003

JAMES E. ROGAN
*Director of the United States Patent and Trademark Office*